United States Patent [19]

Huiskamp et al.

[11] Patent Number: 5,052,827
[45] Date of Patent: Oct. 1, 1991

[54] BEARING

[75] Inventors: Bernhard Huiskamp; Ronald J. van Brakel, both of Nieuwegein, Netherlands

[73] Assignee: SKF Industrial Trading & Development Co. B. V., Nieuwegien, Netherlands

[21] Appl. No.: 606,142

[22] Filed: Oct. 31, 1990

[30] Foreign Application Priority Data

Nov. 24, 1989 [NL] Netherlands .................. 8902910

[51] Int. Cl.$^5$ .............................................. F16C 19/52
[52] U.S. Cl. ................................................. 384/448
[58] Field of Search ............... 384/448, 474, 473, 462, 384/568

[56] References Cited

U.S. PATENT DOCUMENTS

| | | | |
|---|---|---|---|
| 4,854,748 | 8/1989 | Gabielli et al. | 384/474 |
| 4,881,829 | 11/1989 | Koelsch | 384/448 |
| 4,948,270 | 8/1990 | Minard et al. | 384/448 |
| 4,958,941 | 9/1990 | Imanari | 384/474 |

Primary Examiner—Lenard A. Footland
Attorney, Agent, or Firm—Eugene E. Renz, Jr.

[57] ABSTRACT

Bearing for holding a rotating shaft or similar device, including a housing in which the elements supporting the shaft are contained and which at one end an opening has been made which can be brought into contact with a system for supplying a lubricant in the form of a grease, and which terminates inside the housing in a space on one side of the supporting elements and in which, at the other end, a second opening closed by a removable closure has been made which terminates inside the housing in a second space located on the other side of the supporting elements in which the grease flowing through said supporting elements can be captured, characterized by the fact that the removable closure of the aforementioned second opening (12) is formed by a tubular device (13) closed at one end which projects into the second space, and that at least the part projecting inside this space is equipped with a number of openings (14) in a wall of said tubular device (13).

3 Claims, 1 Drawing Sheet 5,052,827

BEARING

FIELD OF THE INVENTION

The invention concerns a bearing for holding a rotating shaft or similar device, including a housing in which the elements supporting the shaft are contained and in which at one end an opening has been made which can be brought into contact with a system for supplying a lubricant in the form of a grease. The opening terminates inside the housing in a space on the one side of the supporting elements. At the other end, a second opening, closed by a removable closure, has been made which terminates inside the housing in a second space located on the other side of the supporting elements in which the grease flowing through the supporting elements can be captured.

BACKGROUND OF THE INVENTION

In similar bearings lubricated with grease, it is important that the grease captured in the second space, after flowing through the supporting elements and therefore having completed its greasing action and now constituting used lubricant, be inspected on a regular basis because the condition of this used grease reveals the condition of the bearing. Any developing defect in the bearing may thus be detected at an early stage.

For this purpose, in known bearings, the cover of the second opening is removed according to a regular schedule and, by means of some tool, a sample of the grease is taken from the second space and examined. However, sampling the grease in this manner is a complicated operation and, although the schedule may be written down, e.g., on a card specifically intended for the bearing, people often forget to take grease samples at the proper time.

SUMMARY OF THE INVENTION

The objective of the invention is to provide a better bearing of this type.

This objective is reached because in the bearing according to the invention, the removable closure of the aforementioned second opening is formed by a tubular device which is closed at one end and projects into the second space, and wherein at least the part projecting inside this space is equipped with a number of openings in its wall. In this context it is preferable that the tubular device be equipped at the top with an indicator showing whether the device is filled with grease or not.

In a bearing executed in this manner, the grease which is forced into the second space by the rotation of the shaft collides with the tubular device and is pressed inside it through the openings in the device. After a certain amount of grease has collected in this manner inside the tubular device, the tubular device is removed, thus providing a sample of the used grease, so that no special sampling tool is required. The moment at which a sample of the grease must be taken is indicated by the aforementioned indicator, so that one glance at the bearing will reveal whether it is time to take a sample or not.

In the preferred embodiment, the indicator which shows whether the device is filled with lubricant or not consists of a pin-shaped element which projects downward in an opening in the closed top end of the tubular device, and can move freely in an upward direction.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
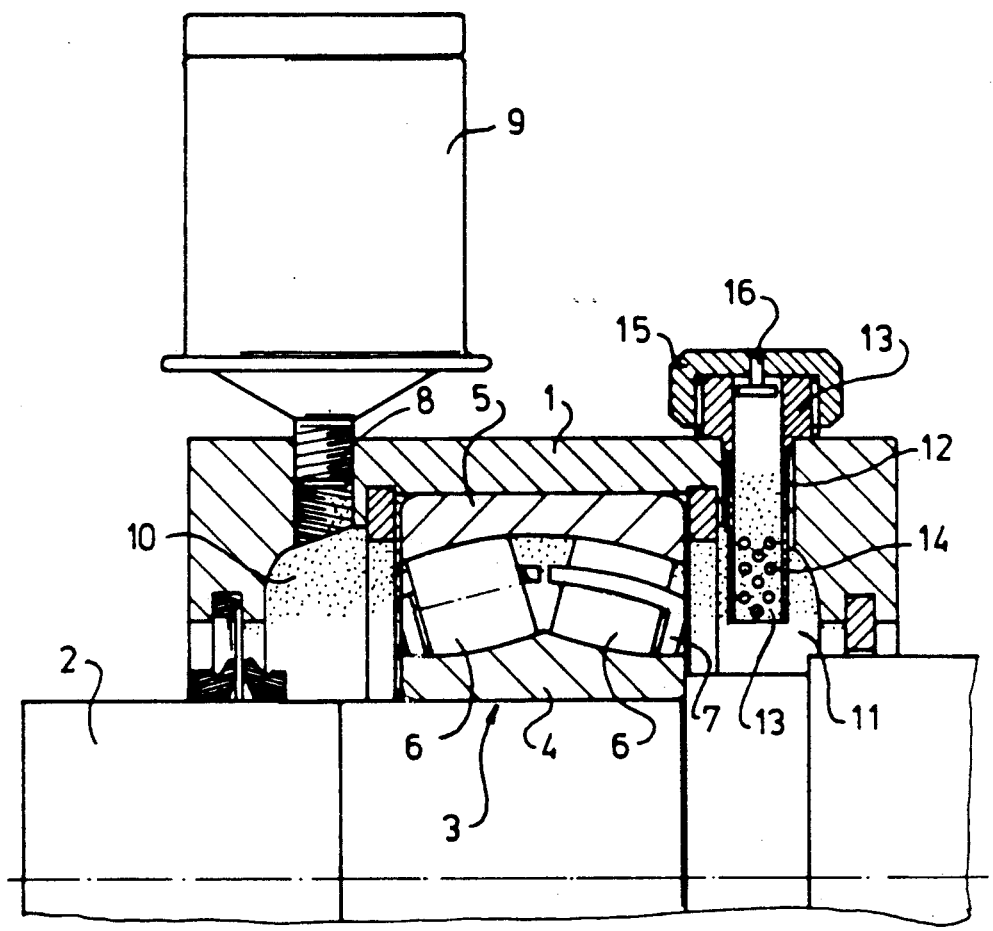
FIG. 1 is a traverse sectional view showing a bearing in accordance with the present invention.

As shown in the drawing, the bearing includes a housing 1 installed around a shaft 2 and containing elements supporting the shaft. Whereby the support elements consist of a roller bearing 3 having an inner ring 4 located around the shaft 2 and an outer ring 5 attached to the housing 1 and two rows of roller elements 6 located between the rings 4 and 5 and separated from one another by a cage 7.

The housing 1 has an opening 8 in which the spout of a container 9 has been screwed. By means of this container 9 which is filled with grease, grease is supplied continuously to the bearing when it is in operation, via a first space 10 inside the housing 1. The grease moves through the roller elements 6 between the rings 4 and 5, after which it flows into a second space 11.

A second opening 12 in the housing 1 terminates in this second space 11, whereby this opening 12 is closed by means of a screwed-in tubular device 13 whose lowest part projects into the second space 11 and is equipped with a number of openings 14 through its walls. The tubular device 13 is closed at its top end with a cap 15 which has an opening to receive a pin-shaped element 16 which can move freely in an vertical direction.

As a result, the used greased flowing into the second space 11 is pushed against the tubular device 13 and penetrates through the openings 14 into the tubular device 13, so that over time the grease comes into contact with the pin-shaped element 16 and pushes this element upward, so that it will stick up above the cap 15, something which can be easily noticed. As soon as the protruding position of the pin-shaped element 16 is noticed, the tubular device 13 must be removed from the opening 12 by screwing, following which the grease sample inside can be analyzed in order to determine whether the bearing is still in good condition.

Even though a particular embodiment of the invention has been illustrated and described herein, it is understood that changes of modifications may be made therein with the scope of the following claims.

What is claimed is:

1. Bearing for holding a rotating shaft including a housing in which elements supporting the shaft are contained and which at one end an opening has been made which can be brought into contact with a system for supplying a lubricant in the form of a grease, and which terminates inside the housing in a space on one side of the supporting elements and in which, at the other end, a second opening closed by a removable closure has been made which terminates inside the housing in a second space located on the other side of the supporting elements in which the grease flowing through said supporting elements can be captured, characterized by the fact that the removable closure of said second opening (12) is formed by a tubular device (13) closed at one end which projects into the second space, and that at least the part projecting inside this space is equipped with a number of openings (14) in a wall of said tubular device (13).

2. Bearing according to claim 1, characterized by the fact that the tubular device (13) is equipped at the top with an indicator showing whether the device is filled with grease or not.

3. Bearing according to claim 2, characterized by the fact that said indicator consists of a pin-shaped element (16) which projects downward in an opening in the closed top end (15) of the tubular device (13), and can move freely in an vertical direction.

* * * * *